United States Patent
Xiu et al.

(10) Patent No.: US 12,316,867 B2
(45) Date of Patent: May 27, 2025

(54) OVERLAPPED BLOCK MOTION COMPENSATION FOR INTER PREDICTION

(71) Applicant: BEIJING DAJIA INTERNET INFORMATION TECHNOLOGY CO., LTD., Beijing (CN)

(72) Inventors: Xiaoyu Xiu, San Diego, CA (US); Che-Wei Kuo, Beijing (CN); Wei Chen, San Diego, CA (US); Yi-Wen Chen, San Diego, CA (US); Hong-Jheng Jhu, San Diego, CA (US); Xianglin Wang, San Diego, CA (US); Bing Yu, Beijing (CN)

(73) Assignee: Beijing Dajia Internet Information Technology Co., Ltd., Beijing (CN)

( * ) Notice: Subject to any disclaimer, the term of this patent is extended or adjusted under 35 U.S.C. 154(b) by 0 days.

(21) Appl. No.: 17/676,806

(22) Filed: Feb. 21, 2022

(65) Prior Publication Data
US 2022/0272375 A1    Aug. 25, 2022

Related U.S. Application Data

(60) Provisional application No. 63/152,326, filed on Feb. 22, 2021.

(51) Int. Cl.
*H04N 19/159* (2014.01)
*H04N 19/105* (2014.01)
(Continued)

(52) U.S. Cl.
CPC ......... *H04N 19/517* (2014.11); *H04N 19/105* (2014.11); *H04N 19/159* (2014.11); *H04N 19/176* (2014.11)

(58) Field of Classification Search
CPC .. H04N 19/517; H04N 19/105; H04N 19/159; H04N 19/176
(Continued)

(56) References Cited

U.S. PATENT DOCUMENTS

| 11,303,900 B2* | 4/2022 | Hsu ...................... H04N 19/105 |
| 2006/0193388 A1* | 8/2006 | Woods ................ H04N 19/615 |
| | | 375/E7.072 |

(Continued)

FOREIGN PATENT DOCUMENTS

| WO | 2019201203 A1 | 10/2019 | |
| WO | WO-2022077495 A1 * | 4/2022 | |
| WO | WO-2022140724 A1 * | 6/2022 | ........... H04N 19/105 |

OTHER PUBLICATIONS

Xiu, Xiaoyu et al., Description of SDR, HDR, and 360° Video Coding Technology Proposal by InterDigital Communications and Dolby Laboratories, Joint Video Experts Team (JVET) of ITU-T SG 16 WP 3 and ISO/IEC JTC 1/ SC 29/WG 11, JVET-J0015-v1, 10th Meeting: San Diego, CA, Apr. 10-20, 2018, (82p).

Primary Examiner — Albert Kir
(74) Attorney, Agent, or Firm — Arch & Lake LLP

(57) ABSTRACT

A method for video encoding is provided. The method includes: partitioning a frame of video data into a plurality of blocks; obtaining a current prediction of a current block of the plurality of blocks using one or more motion vectors of the current block; obtaining one or more collocated predictions of the current block using one or more motion vectors of one or more neighbor blocks of the current block in respective one or more blending areas, where each of the one or more blending areas is at least part of the current block and adjustable based at least on the partitioning; and obtaining a combined prediction of the current block by combing the current prediction with the one or more collocated predictions.

15 Claims, 11 Drawing Sheets

(51) Int. Cl.
*H04N 19/176* (2014.01)
*H04N 19/517* (2014.01)

(58) Field of Classification Search
USPC .................................................. 375/240.12
See application file for complete search history.

(56) References Cited

U.S. PATENT DOCUMENTS

| | | | |
|---|---|---|---|
| 2013/0128974 A1* | 5/2013 | Chien | H04N 19/17 375/240.15 |
| 2016/0295215 A1 | 10/2016 | Hsu | |
| 2016/0330475 A1 | 11/2016 | Zhou | |
| 2019/0387251 A1 | 12/2019 | Lin et al. | |
| 2021/0306656 A1* | 9/2021 | Liao | H04N 19/159 |
| 2021/0306657 A1* | 9/2021 | Chen | H04N 19/105 |
| 2021/0385485 A1* | 12/2021 | Liao | H04N 19/105 |
| 2022/0038727 A1* | 2/2022 | Li | H04N 19/159 |
| 2022/0132120 A1* | 4/2022 | Zhang | H04N 19/70 |
| 2022/0272323 A1* | 8/2022 | Li | H04N 19/136 |
| 2022/0272375 A1* | 8/2022 | Xiu | H04N 19/176 |

* cited by examiner

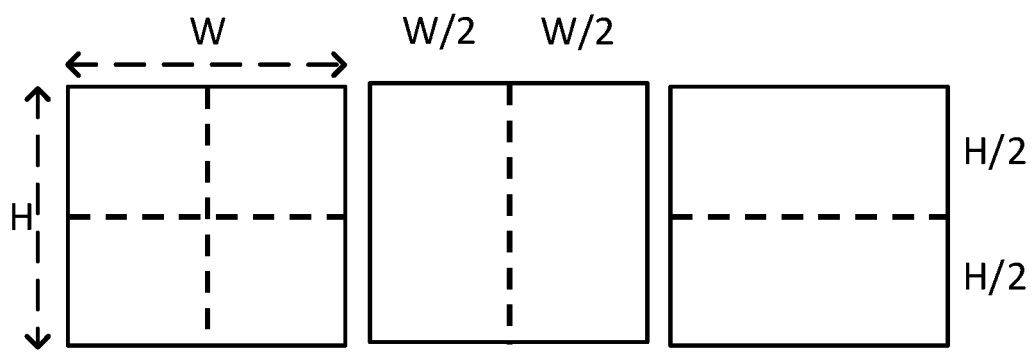
FIG. 2A  FIG. 2B  FIG. 2C
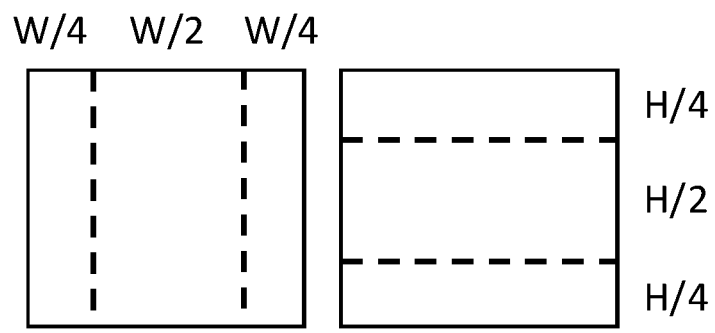
FIG. 2D  FIG. 2E

→⁴⁰¹ MV_L0 from collocated block  →⁴¹¹ MV_L1 from collocated block
⇢⁴⁰² MV_L0 from current block (after scaling)  ⇢⁴¹² MV_L1 from current block (after scaling)

Motion information of four spatial neighbors are used for the OBMC of A

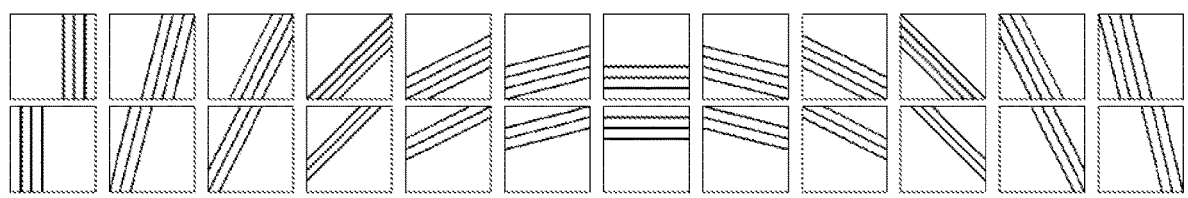
FIG. 10
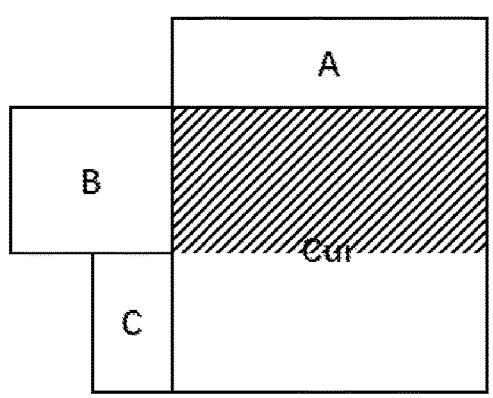 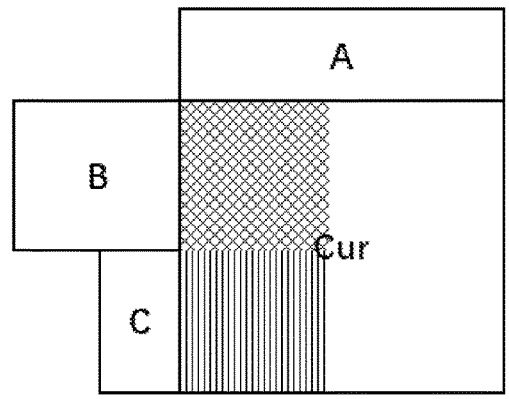
FIG. 11A　　　　　　　　FIG. 11B

OVERLAPPED BLOCK MOTION COMPENSATION FOR INTER PREDICTION

CROSS-REFERENCE TO RELATED APPLICATION

This application claims priority to U.S. Provisional Application Ser. No. 63/152,326, entitled "Improved overlapped block motion compensation for inter prediction", filed on Feb. 22, 2021, which is expressly incorporated by reference in its entirety for all purposes.

TECHNICAL FIELD

This disclosure is related to video coding and compression. More specifically, this disclosure relates to methods and apparatus on improving the coding efficiency and simplifying the complexity of overlapped block motion compensation (OBMC).

BACKGROUND

Various video coding techniques may be used to compress video data. Video coding is performed according to one or more video coding standards. For example, nowadays, some well-known video coding standards include Versatile Video Coding (VVC), High Efficiency Video Coding (HEVC, also known as H.265 or MPEG-H Part2) and Advanced Video Coding (AVC, also known as H.264 or MPEG-4 Part 10), which are jointly developed by ISO/IEC MPEG and ITU-T VECG. AOMedia Video 1 (AV1) was developed by Alliance for Open Media (AOM) as a successor to its preceding standard VP9. Audio Video Coding (AVS), which refers to digital audio and digital video compression standard, is another video compression standard series developed by the Audio and Video Coding Standard Workgroup of China. Most of the existing video coding standards are built upon the famous hybrid video coding framework i.e., using block-based prediction methods (e.g., inter-prediction, intra-prediction) to reduce redundancy present in video images or sequences and using transform coding to compact the energy of the prediction errors. An important goal of video coding techniques is to compress video data into a form that uses a lower bit rate while avoiding or minimizing degradations to video quality.

SUMMARY

Examples of the present disclosure provide methods and apparatus for improving the coding efficiency and simplifying the complexity of overlapped block motion compensation (OBMC) in video coding.

In a first aspect of the present disclosure, a method for video encoding is provided. The method includes: partitioning a frame of video data into a plurality of blocks; obtaining a current prediction of a current block of the plurality of blocks using one or more motion vectors of the current block; obtaining one or more collocated predictions of the current block using one or more motion vectors of one or more neighbor blocks of the current block in respective one or more blending areas, where each of the one or more blending areas is at least part of the current block and adjustable based at least on the partitioning; and obtaining a combined prediction of the current block by combing the current prediction with the one or more collocated predictions.

In a second aspect of the present disclosure, a method for video decoding is provided. The method includes: receiving a current block from a bitstream, where the current block is one of a plurality of blocks partitioned from a frame of encoded video data; obtaining a current prediction of the current block using one or more motion vectors of the current block; obtaining one or more collocated predictions of the current block using one or more motion vectors of one or more neighbor blocks of the current block in respective one or more blending areas, where each of the one or more blending areas is at least part of the current block and adjustable based at least on the partitioning; and obtaining a combined prediction of the current block by combing the current prediction with the one or more collocated predictions.

In a third aspect of the present disclosure, an apparatus for encoding video data is provided. The apparatus includes a memory and at least one processor coupled to the memory. The at least one processor is configured to: partition a frame of video data into a plurality of blocks; obtain a current prediction of a current block of the plurality of blocks using one or more motion vectors of the current block; obtain one or more collocated predictions of the current block using one or more motion vectors of one or more neighbor blocks of the current block in respective one or more blending areas, where each of the one or more blending areas is at least part of the current block and adjustable based at least on the partitioning; and obtain a combined prediction of the current block by combing the current prediction with the one or more collocated predictions.

In a fourth aspect of the present disclosure, an apparatus for decoding video data is provided. The apparatus includes a memory and at least one processor coupled to the memory. The at least one processor is configured to: receive a current block from a bitstream, where the current block is one of a plurality of blocks partitioned from a frame of encoded video data; obtain a current prediction of the current block using one or more motion vectors of the current block; obtain one or more collocated predictions of the current block using one or more motion vectors of one or more neighbor blocks of the current block in respective one or more blending areas, where each of the one or more blending areas is at least part of the current block and adjustable based at least on the partitioning; and obtain a combined prediction of the current block by combing the current prediction with the one or more collocated predictions.

In a fifth aspect of the present disclosure, a non-transitory computer readable medium storing computer code for encoding video data is provided. The computer code when executed by a processor causes the processor to: partition a frame of video data into a plurality of blocks; obtain a current prediction of a current block of the plurality of blocks using one or more motion vectors of the current block; obtain one or more collocated predictions of the current block using one or more motion vectors of one or more neighbor blocks of the current block in respective one or more blending areas, where each of the one or more blending areas is at least part of the current block and adjustable based at least on the partitioning; and obtain a combined prediction of the current block by combing the current prediction with the one or more collocated predictions.

In a sixth aspect of the present disclosure, a non-transitory computer readable medium storing computer code for decoding video data is provided. The computer code when executed by a processor causes the processor to: receive a current block from a bitstream, where the current block is one of a plurality of blocks partitioned from a frame of encoded video data; obtain a current prediction of the current block using one or more motion vectors of the current block; obtain one or more collocated predictions of the current block using one or more motion vectors of one or more neighbor blocks of the current block in respective one or more blending areas, where each of the one or more blending areas is at least part of the current block and adjustable based at least on the partitioning; and obtain a combined prediction of the current block by combing the current prediction with the one or more collocated predictions.

In a seventh aspect of the present disclosure, a non-transitory computer readable medium storing computer code, which when executed by a processor, causes the processor to perform following operations is provided: partitioning a frame of video data into a plurality of blocks; obtaining a current prediction of a current block of the plurality of blocks using one or more motion vectors of the current block; obtaining one or more collocated predictions of the current block using one or more motion vectors of one or more neighbor blocks of the current block in respective one or more blending areas, where each of the one or more blending areas is at least part of the current block and adjustable based at least on the partitioning; and obtaining a combined prediction of the current block by combing the current prediction with the one or more collocated predictions.

Other aspects or variations of the disclosure will become apparent by consideration of the following detailed description and accompanying drawings.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIGS. 2A to 2E illustrate schematic diagrams of block partitions in multi-type tree structure: quaternary partition, vertical binary partition, horizontal binary partition, vertical ternary partition, and horizontal ternary partition, according to one or more aspects of the present disclosure.

FIG. 10 illustrates a schematic diagram of allowed GPM partitions according to one or more aspects of the present disclosure.

FIGS. 11A and 11B illustrate schematic diagrams of an OBMC scheme using the MVs of top neighbors and left neighbors, according to one or more aspects of the present disclosure.

DETAILED DESCRIPTION

Figure 1:
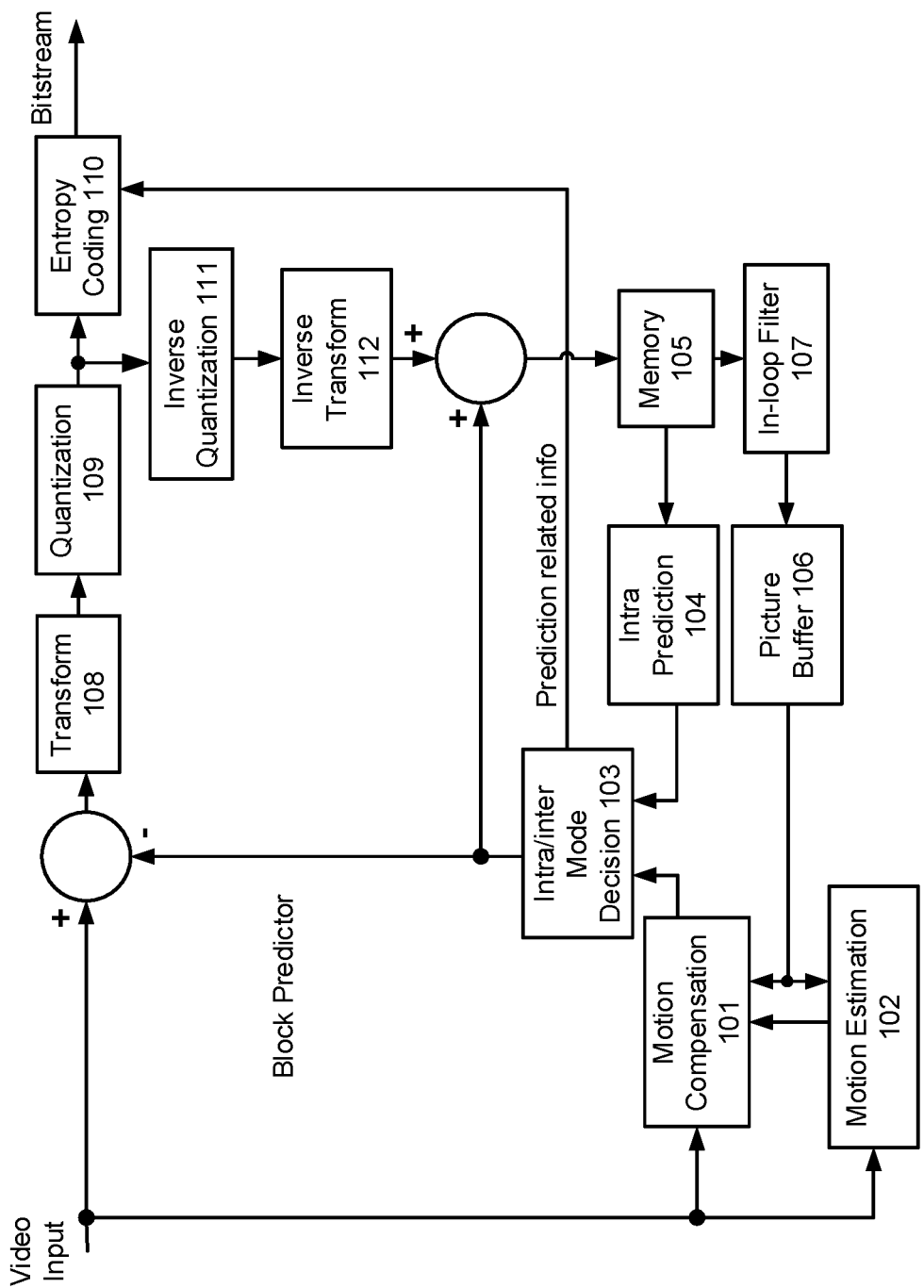
FIG. 1 illustrates a general block diagram of a block-based video encoder for Versatile Video Coding (VVC) according to one or more aspects of the present disclosure.

The first version of the HEVC standard was finalized in October 2013, which offers approximately 50% bit-rate saving or equivalent perceptual quality compared to the prior generation video coding standard H.264/MPEG AVC. Although the HEVC standard provides significant coding improvements than its predecessor, there is evidence that superior coding efficiency can be achieved with additional coding tools. Based on that, both VCEG and MPEG started the exploration work of new coding technologies for future video coding standardization. one Joint Video Exploration Team (WET) was formed in October 2015 by ITU-T VECG and ISO/IEC MPEG to begin significant study of advanced technologies that could enable substantial enhancement of coding efficiency. One reference software called joint exploration model (JEM) was maintained by the JVET by integrating several additional coding tools on top of the HEVC test model (HM).

In October 2017, the joint call for proposals (CfP) on video compression with capability beyond HEVC was issued by ITU-T and ISO/IEC. In April 2018, 23 CfP responses were received and evaluated at the 10-th JVET meeting, which demonstrated compression efficiency gain over the HEVC around 40%. Based on such evaluation results, the JVET launched a new project to develop the new generation video coding standard that is named as Versatile Video Coding (VVC). In the same month, one reference software codebase, called VVC test model (VTM), was established for demonstrating a reference implementation of the VVC standard.

The first generation AVS standard includes Chinese national standard "Information Technology, Advanced Audio Video Coding, Part 2: Video" (known as AVS1) and "Information Technology, Advanced Audio Video Coding Part 16: Radio Television Video" (known as AVS+). It can offer around 50% bit-rate saving at the same perceptual quality compared to MPEG-2 standard. The AVS1 standard video part was promulgated as the Chinese national standard in February 2006. The second generation AVS standard includes the series of Chinese national standard "Information Technology, Efficient Multimedia Coding" (knows as AVS2), which is mainly targeted at the transmission of extra HD TV programs. The coding efficiency of the AVS2 is double of that of the AVS+. In May 2016, the AVS2 was issued as the Chinese national standard. Meanwhile, the AVS2 standard video part was submitted by Institute of Electrical and Electronics Engineers (IEEE) as one international standard for applications. The AVS3 standard is one new generation video coding standard for UHD video application aiming at surpassing the coding efficiency of the latest international standard HEVC. In March 2019, at the 68-th AVS meeting, the AVS3-P2 baseline was finished, which provides approximately 30% bit-rate savings over the HEVC standard. Currently, there is one reference software, called high performance model (HPM), is maintained by the AVS group to demonstrate a reference implementation of the AVS3 standard.

Like their preceding standards, both the VVC and AVS3 are built upon the block-based hybrid video coding framework. FIG. 1 gives the block diagram of a generic block-based hybrid video encoding system. The input video signal is processed block by block (called coding units (CUs)). One CU can be up to 128×128 pixels. However, different from the HEVC which partitions blocks only based on quad-trees, in the VVC, one coding tree unit (CTU) is split into CUs to adapt to varying local characteristics based on quad/binary/ternary-tree. Additionally, the concept of multiple partition unit type in the HEVC is removed, i.e., the separation of CU, prediction unit (PU) and transform unit (TU) does not exist in the VVC anymore; instead, each CU is always used as the basic unit for both prediction and transform without further partitions. In the multi-type tree structure, one CTU is firstly partitioned by a quad-tree structure. Then, each quad-tree leaf node can be further partitioned by a binary and ternary tree structure. As shown in FIGS. 2A to 2E, there are five splitting types, quaternary partitioning, horizontal binary partitioning, vertical binary partitioning, horizontal ternary partitioning, and vertical ternary partitioning. In FIG. 1, spatial prediction and/or temporal prediction may be performed (e.g., via motion compensation 101, motion estimation 102, intra/inter mode decision 103, intra prediction 104). Spatial prediction (or "intra prediction") uses pixels from the samples of already coded neighboring blocks (which are called reference samples) in the same video picture/slice to predict the current video block. Spatial prediction reduces spatial redundancy inherent in the video signal. Temporal prediction (also referred to as "inter prediction" or "motion compensated prediction") uses reconstructed pixels from the already coded video pictures to predict the current video block. Temporal prediction reduces temporal redundancy inherent in the video signal. Temporal prediction signal for a given CU is usually signaled by one or more motion vectors (MVs) which indicate the amount and the direction of motion between the current CU and its temporal reference. Also, if multiple reference pictures are supported, one reference picture index is additionally sent, which is used to identify from which reference picture in the reference picture store (e.g., memory 105, picture buffer 106) the temporal prediction signal comes. After spatial and/or temporal prediction, the mode decision block (e.g., intra/inter mode decision 103) in the encoder chooses the best prediction mode, for example based on the rate-distortion optimization method. The prediction block is then subtracted from the current video block; and the prediction residual is de-correlated using transform and quantized (e.g., via transform 108, quantization 109). The quantized residual coefficients are inverse quantized and inverse transformed to form the reconstructed residual (e.g., via inverse quantization 111, inverse transform 112), which is then added back to the prediction block to form the reconstructed signal of the CU. Further in-loop filtering (e.g., in-loop filter 107), such as deblocking filter, sample adaptive offset (SAO) and adaptive in-loop filter (ALF) may be applied on the reconstructed CU before it is put in the reference picture store and used to code future video blocks. To form the output video bit-stream, coding mode (inter or intra), prediction mode information, motion information, and quantized residual coefficients are all sent to the entropy coding unit (e.g., entropy coding 110) to be further compressed and packed to form the bit-stream.

Figure 3:
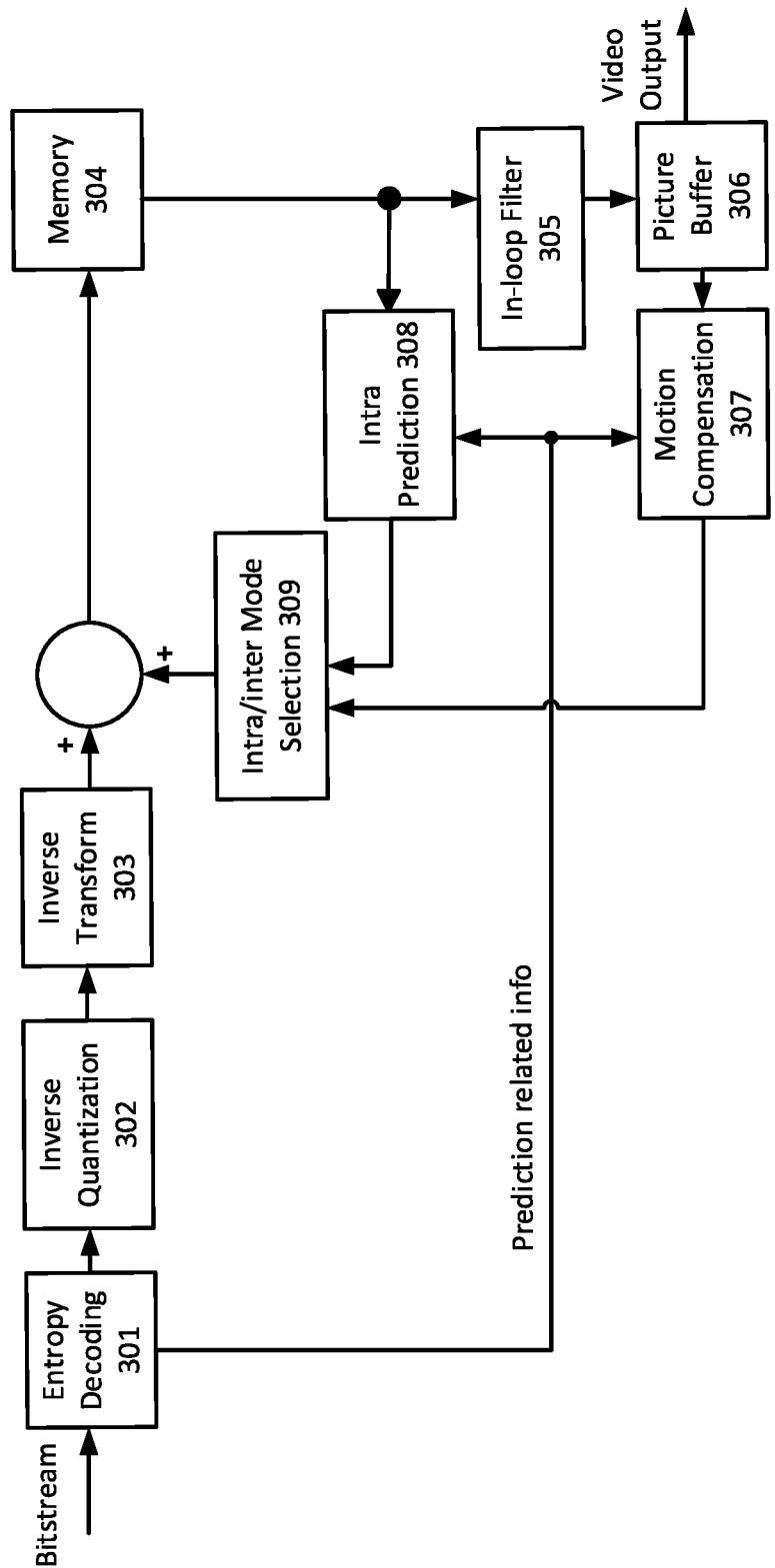
FIG. 3 illustrates a general block diagram of a video decoder for VVC according to one or more aspects of the present disclosure.

FIG. 3 gives a general block diagram of a block-based video decoder. The video bit-stream is first entropy decoded at entropy decoding unit (e.g., entropy decoding 301). The coding mode and prediction information are sent to either the spatial prediction unit (if intra coded) (e.g., intra prediction 308) or the temporal prediction unit (if inter coded) (e.g., motion compensation 307) to form the prediction block. The residual transform coefficients are sent to inverse quantization unit (e.g., inverse quantization 302) and inverse transform unit (e.g., inverse transform 303) to reconstruct the residual block. The prediction block and the residual block are then added together (e.g., through intra/inter mode selection 309 and/or stored in memory 304). The reconstructed block may further go through in-loop filtering before it is stored in reference picture store (e.g., picture buffer 306). The reconstructed video in reference picture store is then sent out to drive a display device, as well as used to predict future video blocks.

In general, the basic inter prediction techniques that are applied in the VVC and the AVS3 are kept the same as that of the HEVC except that several modules are further extended and/or enhanced. For instance, block-matching based motion compensation (MC) is still used as the backbone of the VVC inter coding framework where one coding block can only be associated with one single MV when the coding block is uni-predicted or two MVs when the coding block is bi-predicted. Though the block-based MC is efficient to handle uniform translational motion, it still insufficient to capture the real correlation between pictures in temporal domain because of complicated motion of cameras and irregularity of moving objects. Correspondingly, such inaccurate motion often leads to blocking artifacts to the reconstructed video signal. The OBMC is one method that has been demonstrated to be one efficient method that overcomes the shortcomings of the conventional block-based MC. The basic idea of the OBMC is to use the MVs from the neighbor blocks to perform the motion compensation on the current block and combine the multiple prediction signals using the neighboring MVs to generate the final prediction signal of the current block. This can substantially reduce prediction error and mitigate blocking artifacts at prediction stage. The main focus of this disclosure is to further improve the coding efficiency of the existing OBMC mode. Additionally, some methods are also proposed to reduce the OBMC computational complexity and make it more friendly for practical hardware implementations. To facilitate the following description, the main technical aspects of some existing coding tools in the current VVC and AVS standards that are closely related with the proposed technologies in the disclosure are briefly reviewed.

In the HEVC and its predecessors, each coding block has at most one MV for one prediction direction. In contrast, several sub-block-level motion compensation techniques are adopted in both the VVC and the AVS3 to improve the motion compensation efficiency by increasing the granularity of MV derivation. Specifically, when any of those sub-block modes is applied, one coding block is further split into multiple small sub-blocks and the motion information (i.e., the MV and the associated reference picture) for each sub-block is derived separately. The sub-block motion information is then used to generate the prediction signal of each sub-block (and eventually the block) at the motion compensation stage. In the following, some main sub-block inter coding modes that are adopted in the VVC and AVS3 standards are overviewed.

The VVC supports the sub-block-based temporal motion vector prediction (SbTMVP) method. Similar to the temporal motion vector prediction (TMVP) in HEVC, SbTMVP uses the motion field in the collocated picture to improve the MV precision of the inter CUs in the current picture.

Figure 4:
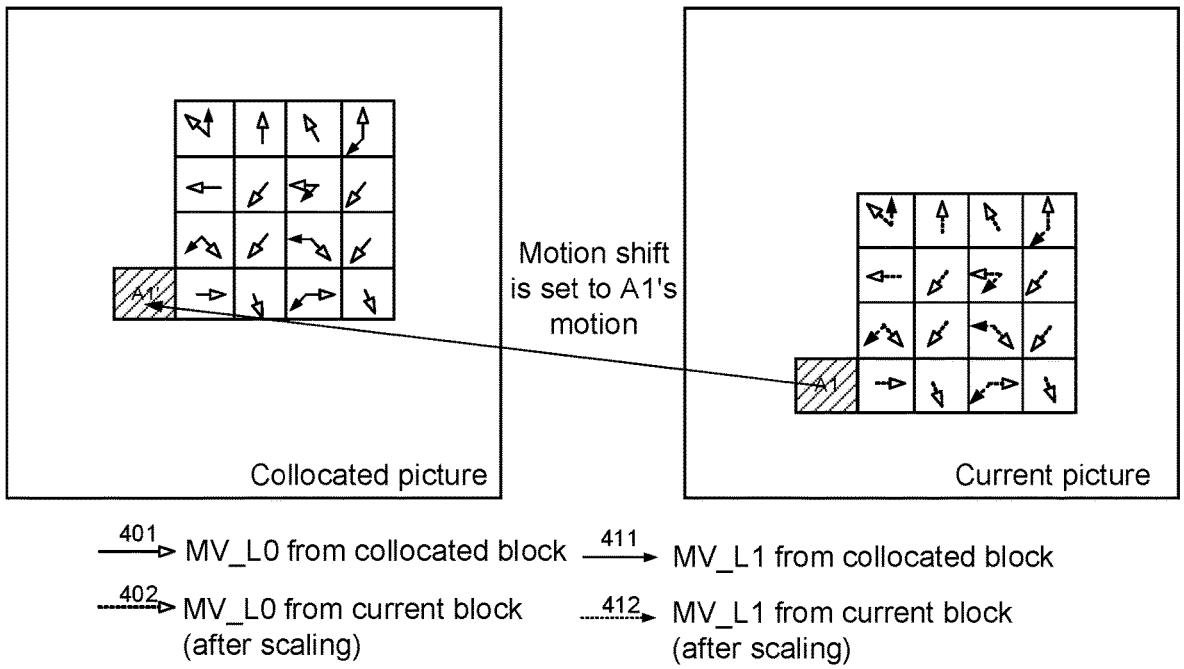
FIG. 4 illustrates schematic diagrams of sub-block-level motion derivation of sub-block-based temporal motion vector prediction (SbTMVP), according to one or more aspects of the present disclosure.

The sub-block-level motion derivation of the SbTMVP mode is illustrated in FIG. 4. Specifically, the SbTMVP predicts the MVs of the sub-blocks inside the current CU by two steps. In the first step, the collocated block that is used to fetch the sub-blocks' motion is firstly identified from the motion information of the spatial neighboring block of the current block. Specifically, in the current ATMVP design, the spatial neighbor A1 in FIG. 4 is considered. If A1 owns one MV (either L0 or L1) which uses the collocated picture (which is signaled in bit-stream) as its reference picture, the corresponding MV of block A1 is selected to identify the collocated block in the collocated picture. The location of the collocated block in the collocated picture is determined by adding the MV of block A1 to the coordinates of the current block. In the second step, for each sub-block in the current block, its motion information is derived from its corresponding small block in the collocated block. Specifically, after the motion information of each small block in the collocated block (as indicated by the arrows 401, 411) is identified, it is converted to the motion information (as indicated by the arrows 402, 412) of the corresponding sub-block in the current block in the same way as the existing temporal motion vector prediction (TMVP) in HEVC where temporal motion vector scaling may be applied.

In the AVS3 standard, one similar tool called enhanced temporal motion vector prediction (ETMVP) is also adopted which follows the same design spirit of the SbTMVP but with subtle differences in some design details.

In conventional MC techniques, only translation motion model is applied for motion compensated prediction. While in the real world, there are many kinds of motion, e.g., zoom in/out, rotation, perspective motions and other irregular motions. In the VVC and AVS3 standards, affine motion compensated prediction is applied by signaling one flag for each inter CU to indicate whether the translation motion model or the affine motion model is applied for inter prediction. In the current affine design, two affine modes, including 4-parameter affine mode and 6-parameter affine mode, are supported for one affine coding block.

Figure 5:
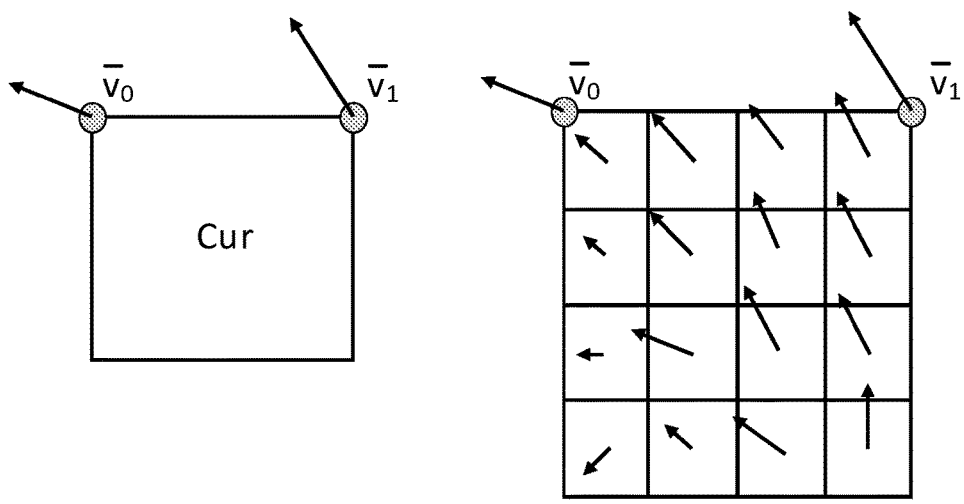
FIG. 5 illustrates a schematic diagram of a 4-parameter affine model according to one or more aspects of the present disclosure.

The 4-parameter affine model has the following parameters: two parameters for translation movement in horizontal and vertical directions respectively, one parameter for zoom motion and one parameter for rotation motion for both directions. Horizontal zoom parameter is equal to vertical zoom parameter. Horizontal rotation parameter is equal to vertical rotation parameter. To achieve a better accommodation of the motion vectors and affine parameter, those affine parameters are translated into two MVs (which are also called control point motion vector (CPMV)) located at the top-left corner and top-right corner of a current block. As shown in FIG. 5, the affine motion field of the block is described by two control point MVs ($V_0$, $V_1$). Based on the control point motion, the motion field ($v_x$, $v_y$) of one affine coded block is described as $$v_x = \frac{(v_{1x} - v_{0x})}{w} x - \frac{(v_{1y} - v_{0y})}{w} y + v_{0x} \qquad (1)$$
$$v_y = \frac{(v_{1y} - v_{0y})}{w} x + \frac{(v_{1x} - v_{0x})}{w} y + v_{0y}$$

Figure 6:
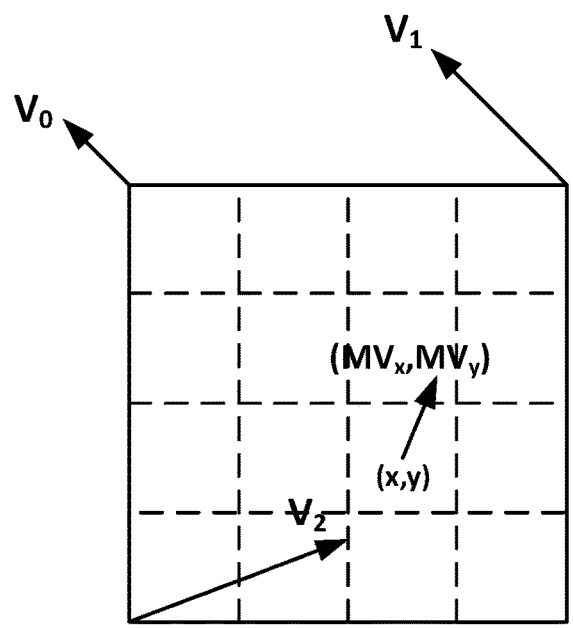
FIG. 6 illustrates a schematic diagram of a 6-parameter affine model according to one or more aspects of the present disclosure.
Figure 7A:
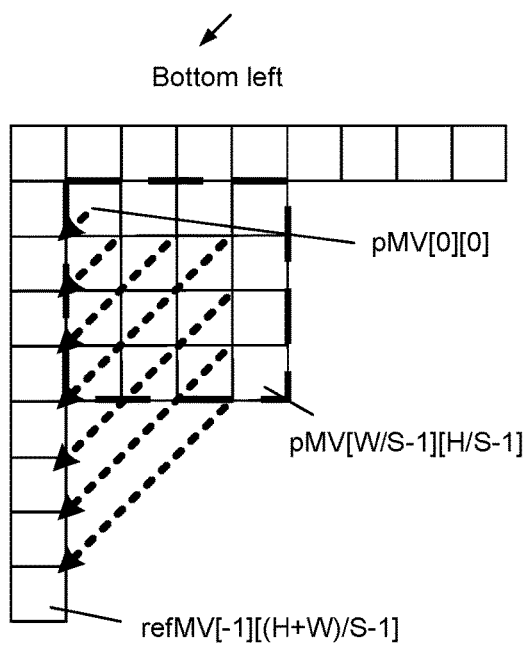
FIGS. 7A to 7E illustrate schematic diagrams of motion vector angular prediction (MVAP) modes: bottom-left, left, above-left, above, above-right, according to one or more aspects of the present disclosure.
Figure 7B:
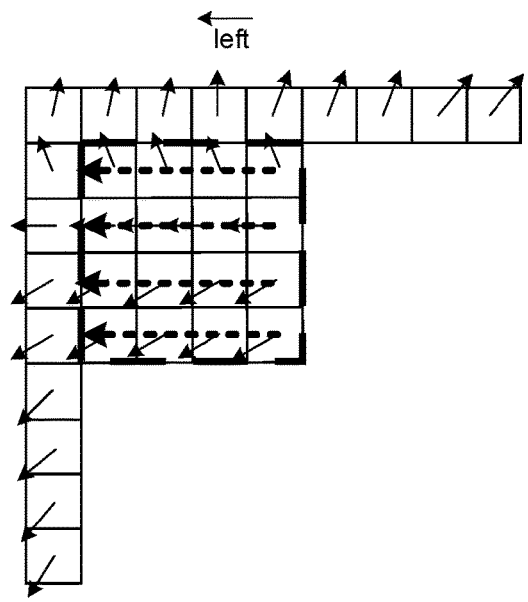
Figure 7C:
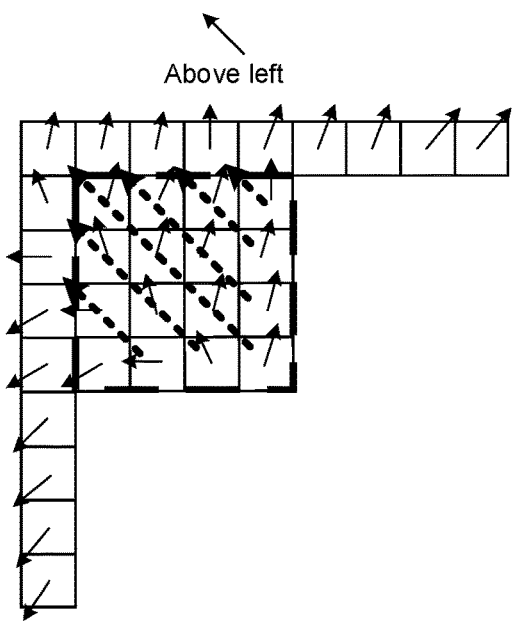
Figure 7D:
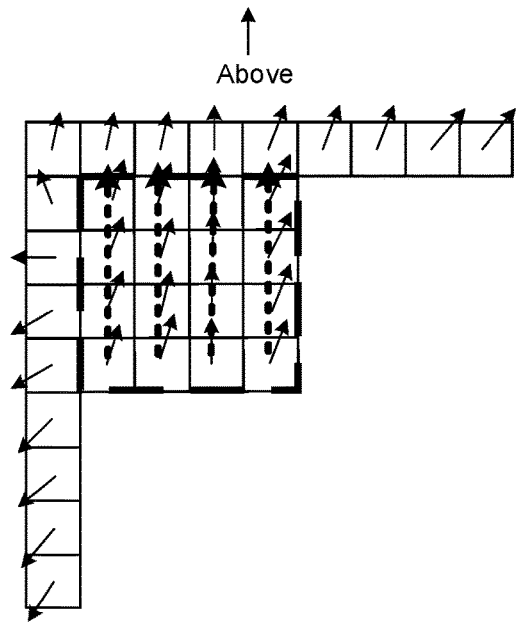
Figure 7E:
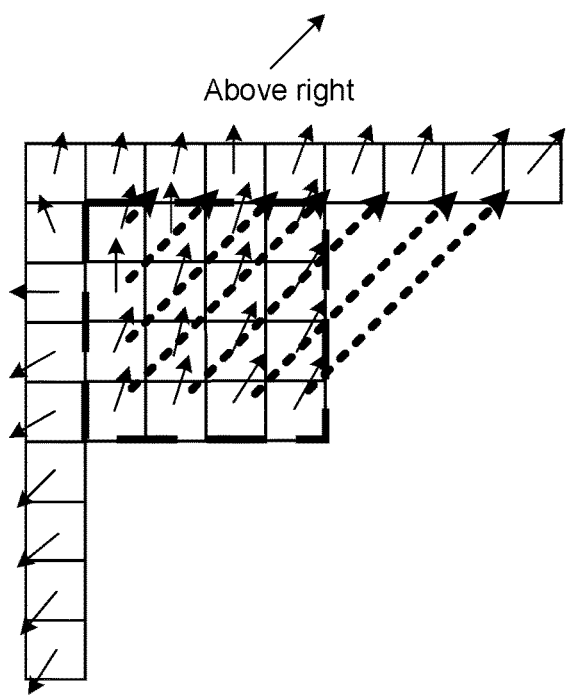

The 6-parameter affine mode has following parameters: two parameters for translation movement in horizontal and vertical directions respectively, one parameter for zoom motion and one parameter for rotation motion in horizontal direction, one parameter for zoom motion and one parameter for rotation motion in vertical direction. The 6-parameter affine motion model is coded with three MVs at three CPMVs. As shown in FIG. 6, three control points of one 6-parameter affine block are located at the top-left, top-right and bottom left corner of the block. The motion at top-left control point is related to translation motion, and the motion at top-right control point is related to rotation and zoom motion in horizontal direction, and the motion at bottom-left control point is related to rotation and zoom motion in vertical direction. Compared to the 4-parameter affine motion model, the rotation and zoom motion in horizontal direction of the 6-parameter may not be same as those motion in vertical direction. Assuming ($V_0$, $V_1$, $V_2$) are the MVs of the top-left, top-right and bottom-left corners of the current block in FIG. 6, the motion vector of each sub-block ($v_x$, $v_y$) is derived using three MVs at control points as:

$$v_x = v_{0x} + (v_{1x} - v_{0x}) * \frac{x}{w} + (v_{2x} - v_{0x}) * \frac{y}{h} \qquad (2)$$
$$v_y = v_{0y} + (v_{1y} - v_{0y}) * \frac{x}{w} + (v_{2y} - v_{0y}) * \frac{y}{h}$$

To simplify the computational complexity of affine prediction, sub-block-based MC is applied to derive the prediction samples of affine mode. Specifically, given the selected CPMVs of one affine CU, the MV of each 4×4 sub-block inside the CU is derived based on equations (1) and (2) using the center of the sub-block as the target coordinates (i.e., x and y in equation (1) and equation (2)). It is assumed that all the samples within the sub-block share the same MV; correspondingly, the calculated MV will be used to generate the predication samples of the sub-block using the existing motion compensation interpolation filtering (MC-IF) process.

To further improve the inter prediction efficiency, another sub-block motion prediction mode which is known as motion vector angular prediction (MVAP) is applied in the AVS3. Similar to the SbTMVP and affine mode, the MVAP conducts the motion compensated prediction on sub-block level where the MVs of each sub-block are generated from the corresponding MVs of the neighboring reconstructed blocks of the current CU. As illustrated in FIGS. 7A to 7E, the MVs of the sub-blocks inside one MVAP CU are projected from the neighboring MVs on the top and left boundaries of the current CU according to one specific projection direction. In the current MVAP design, there are in total 5 different MV prediction directions, including bottom-left, left, above-left, above and above-right. For each specific prediction direction, the corresponding MV of each sub-block are calculated as 1) Bottom-Left Direction:

$$pMV[x][u] = refMV[-1][x+y+1] \qquad (3)$$

2) Left Direction:

$$pMV[x][y] = refMV[-1][y] \qquad (4)$$

3) Above-Left Direction:

$$pMV[x][y] = \begin{cases} refMV[x-y-1][-1], & x \geq y \\ refMV[-1][y-x-1], & x < y \end{cases} \qquad (5)$$

4) Above Direction:

$$pMV[x][y] = refMV[x][-1] \qquad (6)$$

5) Above-Right Direction:

$$pMV[x][y] = refMV[x+y+1][-1] \qquad (7)$$

where refMV denotes the MV of the neighboring blocks and pMV denotes the MV of the sub-block inside the current CU; x and y denotes the coordinate of one sub-block with the above-left corner of the current CU as the origin.

Additionally, in case one neighboring MV are unavailable (e.g., neighboring sub-block is invalid or coded by intra mode), the corresponding MV is generated by repeating the available MV of the closest neighbor to the sub-block.

Figures 8, 9:
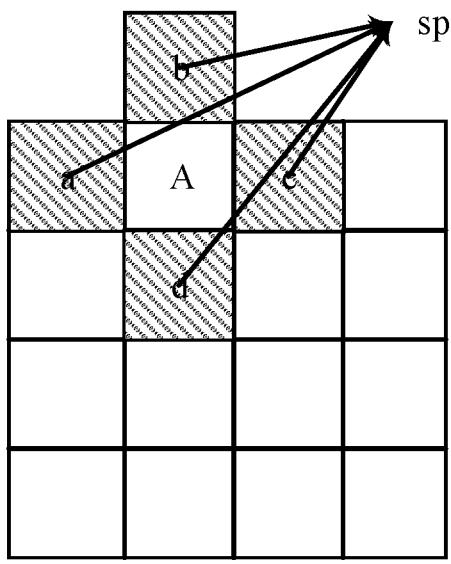
FIG. 8 illustrates a schematic diagram of an OBMC process for the CUs that are coded without sub-block motion compensation according to one or more aspects of the present disclosure.
FIG. 9 illustrates a schematic diagram of an OBMC process for the CUs that are coded by sub-block modes according to one or more aspects of the present disclosure.

The OBMC is applied in the JEM to remove the blocking artifact at the MC stage. As illustrated before, basic idea of the OBMC is to use the MVs from the neighbor blocks to perform the motion compensation on the current block and combine the multiple prediction signals using the neighboring MVs to generate the final prediction signal of the CU. In the JEM, the OBMC is performed for the top and left boundaries of the current CU. Additionally, when one video block is coded in one sub-block mode, the OBMC is also performed on all the inner boundaries (i.e., top, left, bottom, and right boundaries) of each sub-block. FIG. 8 illustrates the OBMC process that is applied to the CUs without sub-block-level motion compensation, where B1 to B7 are the sub-blocks on the top and left boundaries of the current CU and N1 to N8 are the casual neighboring sub-blocks above and left to the current CU. When the OBMC is applied to one sub-block (e.g., the sub-block A in FIG. 9, where OBMC is applied to all the sub-CU blocks (e.g., sub-CU block A) using MVs from all four neighboring blocks (e.g., slashed sub-CU block a, b, c, d)), in addition to the left and top neighbors of one sub-block, the MVs of the neighboring sub-blocks that are to the right and bottom of the current sub-block are also used to derive the prediction signals; then, the four prediction blocks are averaged to generate the final prediction signal of the current sub-block.

Weighted average is used in OBMC to generate the prediction signal of one sub-block. Denote the prediction signal using the motion vector of one neighboring sub-block as PN and the prediction signal using the motion vector of the current sub-block is denoted as PC. When the OBMC is applied, the samples in the first/last four rows/columns of PN are weighted averaged with the samples at the same positions in PC. The samples to which the weighted averaging is applied are determined based on the location of the corresponding neighboring sub-block. Specifically, when the neighboring sub-block is the top neighbor (e.g. sub-block b in FIG. 9), the samples in the first four rows of the current sub-block are adjusted; when the neighboring sub-block is the bottom neighbor (e.g. sub-block d in FIG. 9), the samples in the last four rows of the current sub-block are adjusted; when the neighboring sub-block is left neighbor (e.g., sub-block a in FIG. 9), the samples in the first four columns of the current block are adjusted; when the neighboring sub-block is right neighbor (e.g., sub-block c in FIG. 9), the samples in the last four columns of the current sub-block are adjusted. When the current block is not coded in a sub-block mode, weighting factors {¼, ⅛, 1/16, 1/32} are used for the first four rows/columns of PN and weighting factors {¾, ⅞, 15/16, 31/32} are used for the first four rows/columns of PC. When the current block is coded in sub-block mode, then only the first two rows/columns of PN and PC are averaged. In this case, weighting factors {¼, ⅛} are used for PN and weighting factors {¾, ⅞} are used for PC.

In the VVC, a geometric partitioning mode is supported for inter prediction. The geometric partitioning mode is signaled by one CU-level flag as one special merge mode. In the current GPM design, 64 partitions are supported in total by the GPM mode for each possible CU size with both width and height not smaller than 8 and not larger than 64, excluding 8×64 and 64×8.

When this mode is used, a CU is split into two parts by a geometrically located straight line as shown in FIG. 10, where the splits in each picture have one identical split direction. The location of the splitting line is mathematically derived from the angle and offset parameters of a specific partition. Each part of a geometric partition in the CU is inter-predicted using its own motion; only uni-prediction is allowed for each partition, that is, each part has one motion vector and one reference index. The uni-prediction motion constraint is applied to ensure that same as the conventional bi-prediction, only two motion compensated prediction are needed for each CU. If geometric partitioning mode is used for the current CU, then a geometric partition index indicating the partition mode of the geometric partition (angle and offset), and two merge indices (one for each partition) are further signaled. The number of maximum GPM candidate size is signaled explicitly at sequence level. In the AVS3, the tool is also known as angular weighted prediction (AWP) which follows the similar design of the GPM mode with some minor differences such as different split directions and offsets, the way of generating uni-prediction MVs and so forth.

To further improve the prediction efficiency, inter prediction filter (InterPF) which combines the intra prediction and the merge mode based inter prediction of one CU is applied in the AVS3 standard. Specifically, for each merge CU, one additional flag is signaled to indicate whether the InterPF mode is enabled for the current CU or not. When the flag is false, the InterPF is disabled and the regular inter prediction is applied to generate the prediction samples of the current CU; when the first flag is true, the InterPF is applied to the current CU and another flag is signaled to further indicate which one of two InterPF modes is used. The two InterPF modes are described as follows:

InterPF Mode One: the combined prediction samples are derived as the weighted average of the inter prediction samples and five neighboring reconstructed samples from left, right, above, below:

$$Pred(x,y) = (Pred\_inter(x,y)*5 + Pred\_Q(x,y)*3) >> 3$$

$$Pred\_Q(x,y) = (Pred\_V(x,y) + Pred\_H(x,y) + 1) >> 2$$

$$\text{Pred\_}V(x,y)=((h-1-y)*\text{Rec}(x,-1)+(y+1)*\text{Rec}(-1,h)+\\(h>>1))>>\log 2(h)$$

$$\text{Pred\_}H(x,y)=((w-1-x)*\text{Rec}(-1,y)+(x+1)*\text{Rec}(w,-1)+\\(w>>1))>>\log 2(w) \quad (8)$$

InterPF Mode Two: the combined prediction samples are derived as the weighted average of the inter prediction samples and three neighboring reconstructed samples from left, above:

$$P'(x,y)=f(x)\cdot P(-1,y)+f(y)\cdot P(x,-1)+(1-f(x)-f(y))\cdot P(x,y) \quad (9)$$

In (9), the weight parameters f(x) and f(y) are predefined as one look-up-table (LUT) which are determined based on the size and the intra prediction direction of the current CU.

Although the existing OBMC can efficiently reduce the blocking artifacts at motion compensation stage, its performance can be still improved. Especially, in the current design, the overlapping area where the MVs of surrounding blocks are applied to modified the prediction samples of the current CU are fixed. Such design is inappropriate for advanced block partition structure of the VVC/AVS3 where variable block sizes can be achieved through different QT/BT/TT combinations. On the other hand, the current OBMC design also introduces significant complexity to both encoder and decoder design. Especially, such complexity problem may become serious when the OBMC is applied on top of the sub-block-based MC, given that the same OBMC needs to be repeated multiple times (each for one individual sub-block) to modify the prediction signals of all the sub-blocks within one CU. This could not only lead to significant increases of computational complexity and memory bandwidth but also potentially complicate pipeline design and parallel processing at hardware encoder/decoder.

In this disclosure, methods are proposed to improve the coding efficiency of the OBMC and simplifying the existing OBMC design to facilitate its implementations for hardware codecs. Particularly, to maximize the OBMC's coding gain, special attention is made to better accommodate the OBMC to the current variable block partition structure of the VVC and AVS3 standards. In general, the main aspects of the proposed technologies in the disclosure can be summarized as follows.

To improve the coding efficiency, one adaptive OBMC scheme is proposed. Compared to the existing method where OBMC is fixedly applied on 4-by-4 units, the proposed algorithm adaptively adjusts the region where the OBMC is applied. Additionally, to adapt to varying correlation between neighboring MVs, the weights that are applied to combine the motion compensated predictions of the current CU and its spatial neighbors can also be adaptively changed.

To reduce the worst-case complexity of the OBMC, constraints are proposed to disable the OBMC for the coding modes where multiple hypotheses are needed to generate the prediction samples of the current CU. Firstly, one uni-prediction based OBMC constraint is proposed where the OBMC is only allowed to be applied for the inter blocks are predicted from one single prediction direction (i.e., uni-prediction). Secondly, it is proposed to disable the OBMC for the GPM/AWP and the CIIP/InterPF where additional intra/blending operations are introduced to generate the final prediction samples.

To simplify the computational complexity of the OBMC, it is proposed to only enable the OBMC to the prediction samples on the boundaries between one CU and its casual neighbors (i.e., top and left). For the CUs that are coded in any sub-block modes, the OBMC on their internal sub-block boundaries are always disabled.

As discussed before, regardless of different block sizes and coding modes, the overlapping area where the prediction samples of one current CU are blended with that of its spatial neighbors is kept unchanged in the existing OBMC design. However, in modern video coding standards (such VVC and AVS3), variable block-size partition structures are applied to accommodate local statistics/correlations of different videos. Correspondingly, always using fixed size of sample blending may not be optimal in terms of coding efficiency and encoding/decoding complexity for the OBMC scheme. Firstly, choosing large blending size has the drawback that the prediction samples that are generated using neighboring MVs tend to be far away from the corresponding neighboring blocks. Therefore, the correlation between the prediction samples generated using the current MV and neighboring MV may be insufficient. Additionally, large blending area also leads to increased computational complexity given that more prediction samples need to be generated during the OBMC process. On the other hand, large blending size may also be advantageous in the sense that it can yield a more reliable prediction signal in the presence of noise (i.e., the video capture noise and the noise caused by the coding process). Therefore, it is important to select the optimal blending area for different block sizes and coding modes, where the optimal blending area is able to maximize the correlation between the multiple predictions generated with various MVs while providing enough resistance to coding noise.

Based on the above consideration, one improved OBMC scheme is proposed. Compared to the existing OBMC, the proposed algorithm has two main differences: 1) the OBMC blending area on each boundary of one CU/sub-block is adaptively adjusted based on the block-size and coding modes of the current CU; 2) the optimal weight factors that are applied to combine multiple OBMC prediction samples are adaptively determined based on the correlation between the prediction samples. Additionally, to avoid complicated 2 dimensional (2-D) blending operation, similar to the existing design, the proposed OBMC is divided into multiple steps with 1-D blending: in the first step, only the MVs of neighboring blocks above the current CU/sub-block are used to be combined with the prediction samples close to the top boundary of the current CU/sub-block; in the second step, only the MVs of neighboring blocks left to the current CU/sub-block are used to be combined with the prediction samples near to the left boundary of the current CU/sub-block; further, when the current CU is coded by one sub-block partition mode (e.g., affine, SbTMVP and MVAP), the third and fourth steps are applied to each sub-block where the MVs of neighboring sub-blocks below and right to the current sub-block are used to modify the prediction samples close to the bottom and right boundaries of the sub-block.

To facilitate the description, in the following, regular inter prediction without sub-block partition is used as an example to illustrate the proposed algorithm. Specifically, let $P_{obmc}(x, y)$ denotes the blended prediction sample at coordinate (x, y) after combining the prediction signal of the current CU with multiple prediction signal based on the MVs of its spatial neighbors; $P_{cur}(x, y)$ denotes the prediction sample at coordinate (x, y) of the current CU using its corresponding MVs; $P_{top}(x, y)$ and $P_{left}(x, y)$ denote the prediction samples at the same position of the current CU but using the MVs of the left and right neighbors of the CU, respectively.

Based on the above notations, the boundary prediction samples of the current CU are progressively updated using the MVs of its top and left causal neighbors. As shown in FIGS. 11A and 11B, the block A on top of the current block is firstly checked. If block A is one inter block, its MVs will be assigned to the current block to generate the prediction signal $P_{top}(x, y)$ at collocated position of the current block. After that, an amount of rows under the top boundary of the current block (as indicated by the slashed area in FIG. 11A) in $P_{cur}$ and $P_{top}$ are blended to generate the corresponding OBMC prediction signal $P_{obmc}$. The weighting parameters that are applied to combine two prediction signals are calculated from one predefined function $\varphi_K(l)$ where K is the number of rows where the blending is applied and l=0, 1, . . . , K−1. Specifically, after the OBMC is applied, the updated prediction samples on the top boundary of the current block are calculated as $$P_{obmc}(x,y)=\varphi_K(y) \cdot P_{cur}(x,y)+(1-\varphi_K(y)) \cdot P_{top}(x,y) \quad (10)$$

Next, by following the same procedures, the proposed scheme proceeds to update the prediction samples on the left boundary of the current block by 1) generating the collocated prediction samples $P_{left}(x, y)$ of the current block using the MVs of left spatial neighbors (i.e., blocks B and C); blending $P_{left}(X, y)$ with the existing prediction signal as in (10) to generate the final OBMC prediction signal as:

$$P_{obmc}(x,y)=\varphi_K(x) \cdot P_{obmc}(x,y)+(1-\varphi_K(x)) \cdot P_{left}(x,y) \quad (11)$$

To accommodate varying correlation between the prediction samples generated using the MVs of the current block and its neighboring blocks, different functions $\varphi_K(\cdot)$ may be used to generate the weighting factors for the OBMC blending. In one or more embodiments of the disclosure, it is proposed to use the following cosine function to formulate the correlation function as $$\varphi_K(l) = \omega^* \cdot \sin\left(\frac{\pi}{2K}\left(l+\frac{1}{2}\right)\right) + (1-\omega^*), l = 0, 1, \ldots, K-1 \quad (12)$$

where ω* is the controlling parameter which is used to control the overall range of the weight values that are applied. To persons skilled in modern video coding technologies, other formulation functions (such as raised cosine/sine, exponential function, high-order polynomial function and so forth) can also be applied to generate the weights. In practice, different values of ω* may be applied according to the specific characteristics of the coded video. In one or more embodiments, it is proposed to use one fixed weight value (e.g., 0.5); correspondingly, by such method, there is no need to signal the weight value from encoder to decoder. In another embodiment, it is proposed to determine a set of predefined weight values (e.g., 0.125 and 0.875) and allow it to change from time to time and signal the selected weight value to decoder. In yet another embodiment, it is proposed to give the encoder the freedom to derive arbitrary weight value on-the-fly and signal it in bit-stream. In such case, the values of the allowed weights are fully flexible to choose, i.e., maximizing the encoder flexibility. Meanwhile, when any of the above signaling based scheme is applied, the corresponding weight value may be signaled at various coding levels, e.g., sequence parameter set (SPS), picture parameter set (PPS), picture/slice level or even CTU/CU level.

In FIGS. 11A and 11B, half of the total rows/columns of the prediction samples are blended when the vertical/horizontal OBMC is applied. As mentioned above, different blending size can lead to different coding performance/complexity tradeoff for real codec implementations. In one or more embodiments, it is proposed to use one fixed blending size (e.g., 4 row/columns along the top/left boundaries of one CU/sub-block) for all inter blocks. In another embodiment, it is proposed to adaptive adjust the blending area based on the specific size and partition method of the current CU. For instance, for regular CUs (i.e., the CUs without sub-block partition), it is proposed to determine the blending area based on the size of the CU. Specifically, for the vertical OBMC (i.e., the OBMC from the top neighbors) is enabled, the blending is only applied to M % of the rows of prediction samples close to the CU top boundary; otherwise, when the horizontal OBMC (i.e., the OBMC from left neighbors) is enabled, the blending is only applied to M % of columns of prediction samples close to the CU left boundary. On the other side, when the current CU is coded by one sub-block partition mode (e.g., affine, SbTMVP and MVAP), the corresponding blending size (e.g., M % of rows/columns) is determined based on the corresponding sub-block size rather than the CU size. In one specific example, it is proposed to set M equal to 50, i.e., half of rows/columns are applicable to the OBMC (as shown in FIGS. 11A and 11B). In another embodiment, it is proposed to let encoder decide the blending size when the OBMC is applied and signal this value to decoder.

As discussed above, when the OBMC is enabled for one inter CU, multiple motion compensations need to be performed to generate the prediction samples along both CU and sub-block boundaries. The increased motion compensations not only increase the computational complexity due to the additional interpolation operations but also introduce non-negligible increase of memory bandwidth consumption. To resolve the above complexity problem, one constrained OBMC scheme is proposed where the OBMC is only allowed to be applied for the inter blocks that are predicted from one single prediction direction (i.e., uni-prediction). Meanwhile, when one neighboring block that is used to generate the OBMC prediction samples of the current block is bi-predicted, only the MV from one direction is selected. Specifically, if one neighboring block is uni-predicted, the corresponding MV will be directly applied to produce the prediction samples for the OBMC. Otherwise (i.e., the neighboring block is bi-predicted), the inter prediction samples that are used by the OBMC are generated based on the uni-prediction from one prediction list (either L0 or L1). To select the prediction list, different methods may be applied. In the first method, it is proposed to always select the first prediction (i.e., list L0) for any neighboring block that is predicted by two reference pictures. In the second method, it is proposed always select the second prediction (i.e., list L1) for any neighboring block that is predicted by two reference pictures. In the third method, one adaptive method is applied where the prediction list that is associated with one reference picture with smaller picture order count (POC) distance from the current picture is selected. In case the two reference pictures have equal POC distance to the current picture, the one with smaller better quality will be selected. To decide which reference picture has better reconstruction quality, two methods may be applied. In the first method, the QP parameter that is applied to code the corresponding reference picture/block may be used as criterion and the one with smaller QP will be used for the OBMC. In another method, the layer id may be used as another criterion and the reference picture/block with smaller layer id in the current prediction structure (e.g., hierarchical B structure) may be selected.

Additionally, as mentioned above, the GPM/AWP mode requires two separate motion compensation and one weight average operation whose computational complexity is already larger than regular bi-prediction. Therefore, it will potential exceed the existing worst-case complexity of inter prediction if the OBMC is further applied to the GPM/AWP mode. Based on such consideration, in one or more embodiments, it is proposed to disable the OBMC for the CUs that are coded by the GPM/AWP mode.

Similar to GPM/AWP, CIIP/InterPF mode also introduce more than prediction operations to generate the final prediction signal, including one motion compensation (which could be bi-prediction when the current CU is bi-predicted), one intra prediction and one weighted average. Therefore, in order to control the OBMC overall complexity, as one embodiment of the disclosure, it is proposed to disable the OBMC when the current CU is coded by CIIP/InterPF mode.

Figure 12:
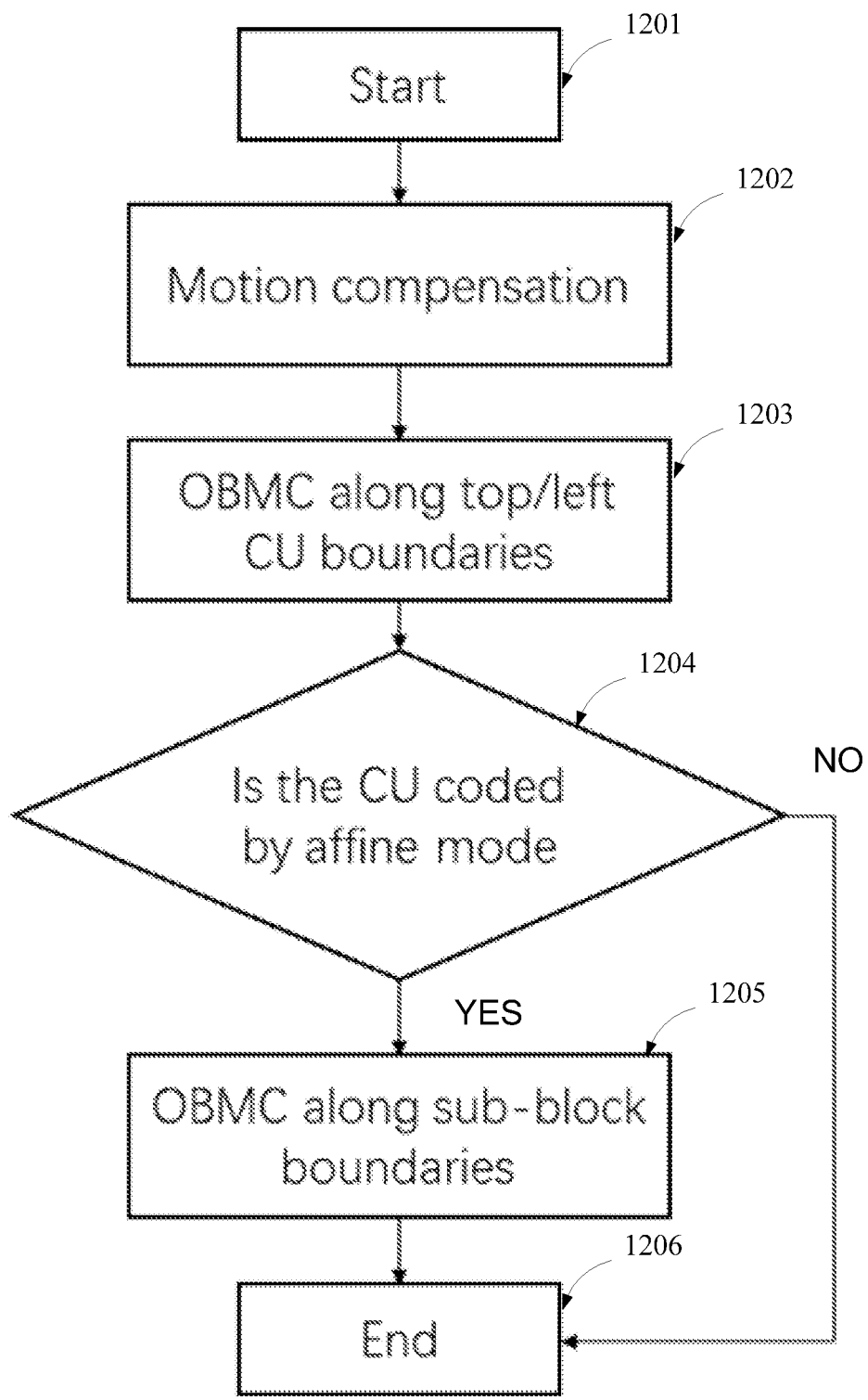
FIG. 12 illustrates an exemplary flowchart of an OBMC process when the OBMC is disabled for sub-block boundaries of SbTMVP and MVAP according to one or more aspects of the present disclosure.

As discussed above, the motivation of the OBMC between the internal boundaries of sub-blocks of one CU (which is coded by one sub-block mode) is to reduce the block artifacts that exists at the sub-block boundaries. This is done by combining multiple prediction signals using the neighboring MVs with the prediction signal of one sub-block. As pointed earlier, this could cause serious complexity problems for practical hardware/software codec designs due to a significant amount of motion compensations that need to be performed for the OBMC. This could not only lead to significant complexity increase but also potentially complicate the pipeline design and parallel processing of both encoder and decoder. On the other hand, the motion parameters of the existing sub-block modes are derived from its spatial/temporal neighboring motion. For instance, the motion field of the SbTMVP is derived from temporal neighbors and the motion field of the affine mode is derived from key spatial neighboring motion based on linear mode. Therefore, this lead to the motion field of most sub-block modes are relatively steady/consistent. This means that the additional performance improvement achieved by the internal OBMC process for sub-block boundaries should be very limited. Based on such analysis, for CUs where sub-block partition is applied (e.g., affine, SbTMVP and MVAP), it is proposed to disable the OBMC for all the prediction samples along the boundaries between different sub-blocks while the OBMC along the CU boundaries are still applied. In some embodiments, it is proposed to enable the OBMC for the sub-block boundaries of affine mode but disable it for the sub-block boundaries of SbTMVP and MVAP modes. In other embodiments, it is proposed to disable the OBMC for the sub-block boundaries of affine mode but enable it for the sub-block boundaries of SbTMVP and MVAP modes. FIG. 12 shows one flowchart to illustrate the OBMC process when the above method is applied. At block 1201, the method starts with a current CU. At block 1202, motion competition may be performed on the current CU. At block 1203, OBMC may be performed along top and/or left boundaries of the current CU. At block 1204, a decision may be made to determine whether the current CU is coded by affine mode. If yes, the process may proceed to block 1205 where OBMC may be performed along sub-block boundaries. Otherwise, the process may proceed to an end at block 1206.

Figure 13:
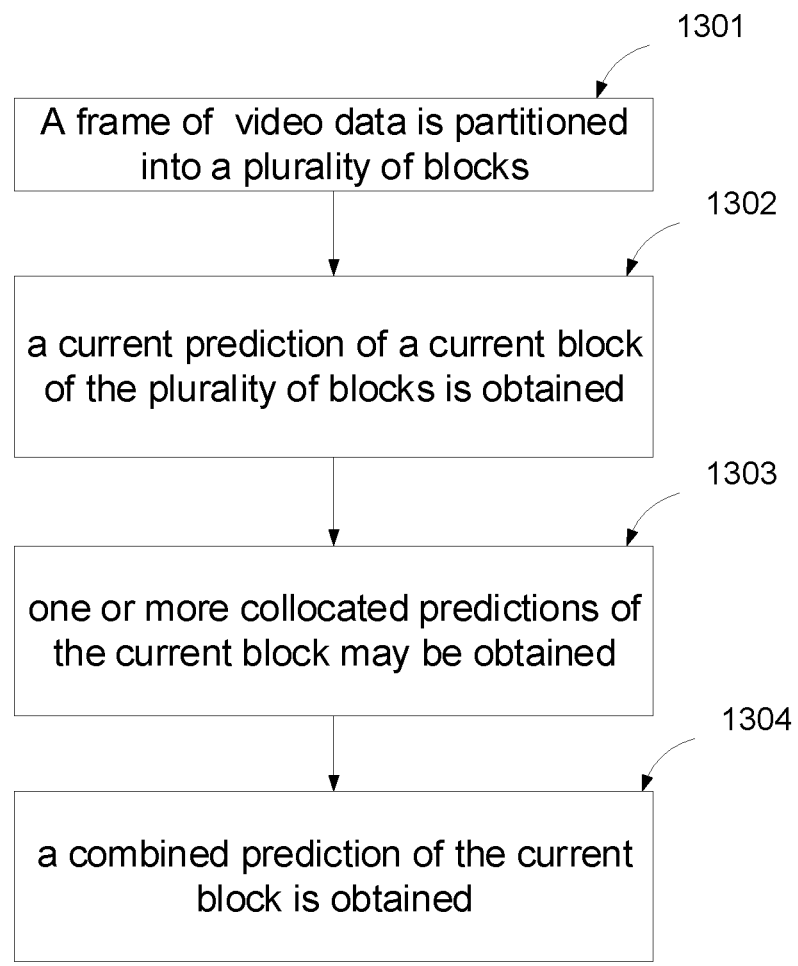
FIG. 13 illustrates an exemplary flowchart of a method for video encoding according to one or more aspects of the present disclosure.

FIG. 13 illustrates an exemplary flowchart of a method for video encoding according to one or more aspects of the present disclosure. At block 1301, a frame of video data may be partitioned into a plurality of blocks. At block 1302, a current prediction of a current block of the plurality of blocks may be obtained using one or more motion vectors of the current block. At block 1303, one or more collocated predictions of the current block may be obtained using one or more motion vectors of one or more neighbor blocks of the current block in respective one or more blending areas, where each of the one or more blending areas may be at least part of the current block and adjustable based at least on the partitioning. At block 1304, a combined prediction of the current block may be obtained by combing the current prediction with the one or more collocated predictions.

Figure 14:
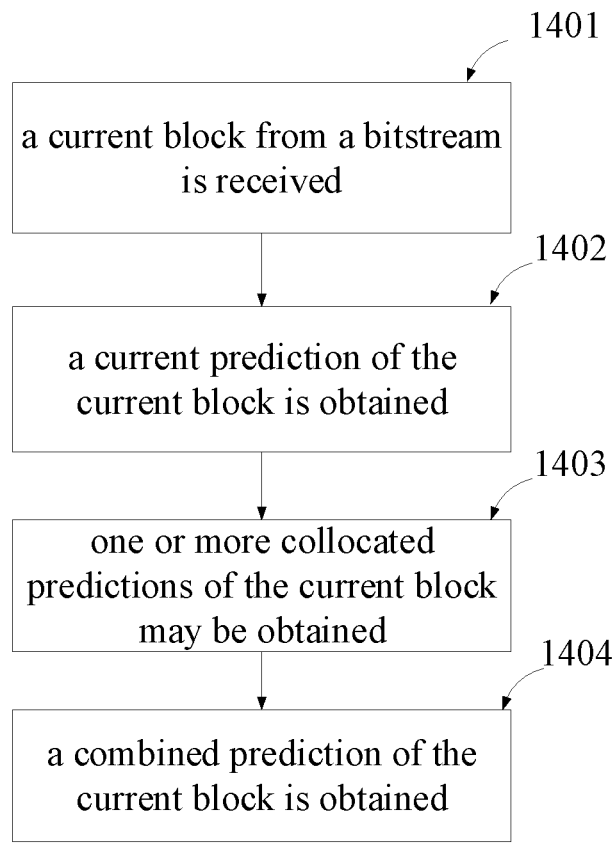
FIG. 14 illustrates an exemplary flowchart of a method for video decoding according to one or more aspects of the present disclosure.

FIG. 14 illustrates an exemplary flowchart of a method for video decoding according to one or more aspects of the present disclosure. At block 1401, a current block from a bitstream may be received, where the current block is one of a plurality of blocks partitioned from a frame of encoded video data. At block 1402, a current prediction of the current block may be obtained using one or more motion vectors of the current block. At block 1403, one or more collocated predictions of the current block may be obtained using one or more motion vectors of one or more neighbor blocks of the current block in respective one or more blending areas, where each of the one or more blending areas is at least part of the current block and adjustable based at least on the partitioning. At block 1404, a combined prediction of the current block may be obtained by combing the current prediction with the one or more collocated predictions.

Figure 15:
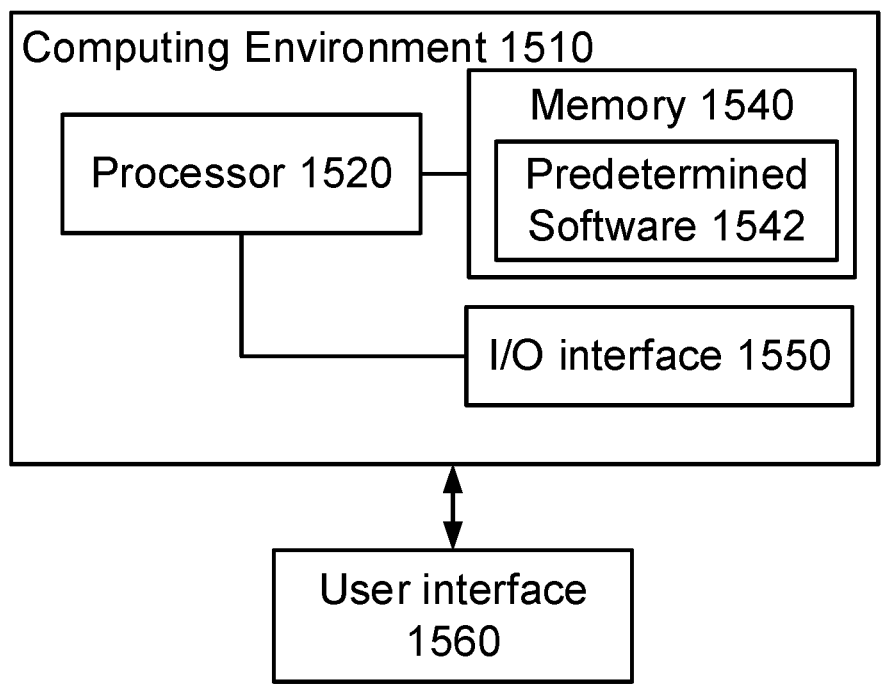
FIG. 15 illustrates a diagram illustrating a computing environment coupled with a user interface according to one or more aspects of the present disclosure.

FIG. 15 shows a computing environment 1510 coupled with a user interface 1560. The computing environment 1510 can be part of a data processing server. The computing environment 1510 includes processor 1520, memory 1540, and I/O interface 1550.

The processor 1520 typically controls overall operations of the computing environment 1510, such as the operations associated with the display, data acquisition, data communications, and image processing. The processor 1520 may include one or more processors to execute instructions to perform all or some of the steps in the above-described methods. Moreover, the processor 1520 may include one or more modules that facilitate the interaction between the processor 1520 and other components. The processor may be a Central Processing Unit (CPU), a microprocessor, a single chip machine, a GPU, or the like.

The memory 1540 is configured to store various types of data to support the operation of the computing environment 1510. Memory 1540 may include predetermine software 1542. Examples of such data comprise instructions for any applications or methods operated on the computing environment 1510, video datasets, image data, etc. The memory 1540 may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The I/O interface 1550 provides an interface between the processor 1520 and peripheral interface modules, such as a keyboard, a click wheel, buttons, and the like. The buttons may include but are not limited to, a home button, a start scan button, and a stop scan button. The I/O interface 1550 can be coupled with an encoder and decoder.

In some embodiments, there is also provided a non-transitory computer-readable storage medium comprising a plurality of programs, such as comprised in the memory 1540, executable by the processor 1520 in the computing environment 1510, for performing the above-described methods. For example, the non-transitory computer-readable storage medium may be a ROM, a RAM, a CD-ROM, a magnetic tape, a floppy disc, an optical data storage device or the like.

The non-transitory computer-readable storage medium has stored therein a plurality of programs for execution by a computing device having one or more processors, where the plurality of programs when executed by the one or more processors, cause the computing device to perform the above-described method for motion prediction.

In some embodiments, the computing environment 1510 may be implemented with one or more application-specific integrated circuits (ASICs), digital signal processors (DSPs), digital signal processing devices (DSPDs), programmable logic devices (PLDs), field-programmable gate arrays (FPGAs), graphical processing units (GPUs), controllers, micro-controllers, microprocessors, or other electronic components, for performing the above methods.

The present disclosure describes a hardware implementation for an apparatus according to one or more aspects of the present disclosure. The apparatus for encoding video data or decoding video data may include a memory and at least one processor. The processor may be coupled to the memory and configured to perform the above mentioned processes described above with reference to FIG. 4 through FIG. 12. The processor may be a general-purpose processor, or may also be implemented as a combination of computing devices, e.g., a combination of a DSP and a microprocessor, multiple microprocessors, one or more microprocessors in conjunction with a DSP core, or any other such configuration. The memory may store the input data, output data, data generated by processor, and/or instructions executed by processor.

The various operations, methods, and systems described in connection with the disclosure herein may be implemented in hardware, software executed by a processor, firmware, or any combination thereof. According one or more aspects of the present disclosure, a computer program product for encoding video data or decoding video data may include processor executable computer code for performing the above mentioned processes described above with reference to FIG. 4 through FIG. 12. According to one or more aspects of the present disclosure, a computer readable medium may store computer code for encoding video data or decoding video data, the computer code when executed by a processor may cause the processor to perform the above mentioned processes described above with reference to FIG. 4 through FIG. 12. Computer-readable media includes both non-transitory computer storage media and communication media including any medium that facilitates transfer of a computer program from one place to another. Any connection may be properly termed as a computer-readable medium. Other embodiments and implementations are within the scope of the disclosure.

The preceding description is provided to enable any person skilled in the art to make or use various embodiments according to one or more aspects of the present disclosure. Various modifications to these embodiments will be readily apparent to those skilled in the art, and the generic principles defined herein may be applied to other embodiments without departing from the scope of the various embodiments. Thus, the claims are not intended to be limited to the embodiments shown herein but is to be accorded the widest scope consistent with the following claims and the principles and novel features disclosed herein.

What is claimed is:

1. A method for video encoding, comprising:
    partitioning a frame of video data into a plurality of blocks;
    obtaining a current prediction of a current block of the plurality of blocks using one or more motion vectors associated with the current block;
    obtaining one or more collocated predictions of the current block in one or more blending areas for overlapped block motion compensation (OBMC) by using one or more motion vectors of one or more neighbor blocks of the current block, wherein each of the one or more blending areas is a part of the current block and adjustable based at least on a coding mode of the current block; and
    obtaining an OBMC prediction of the current block by performing weighted averaging using a part of the current prediction and the one or more collocated predictions in the one or more blending areas;
    wherein in response to determining that the current block is a coding block and the coding mode of the current block is a motion vector angular prediction (MVAP) mode where a motion vector of a sub-block inside the current block is projected from a motion vector of a neighbor block of the current block according to a project direction, the one or more blending areas comprise at least one of left boundary or top boundary of the current block, and each of the one or more collocated predictions of the current block is obtained by using one or more motion vectors of a neighbor block of the current block,
    wherein the motion vector of the sub-block inside the current block is calculated by one of following:

$p\text{MV}[x][y]=\text{refMV}[-1][x+y+1]$ for bottom-left direction, or $p\text{MV}[x][y]=\text{refMV}[-1][y]$ for left direction, wherein pMV denotes the motion vector of the sub-block inside the current block, and refMV denotes the motion vector of the neighbor blocks of the current block.

2. The method of claim 1, wherein obtaining the OBMC prediction of the current block comprises:
    obtaining the OBMC prediction of the current block by using weights that are adaptively determined based on a height or a width of each of the one or more blending areas.

3. The method of claim 1, wherein each of the one or more blending areas is adjustable further based on the partitioning.

4. The method of claim 1, wherein a size of each of the one or more blending areas is determined based on a size of the current block.

5. The method of claim 1, wherein each of the one or more collocated predictions is generated using one motion vector of a corresponding neighbor block of the one or more neighbor blocks of the current block.

6. An apparatus for encoding video data, comprising:
    a memory; and
    at least one processor coupled to the memory and configured to perform acts comprising:
    partitioning a frame of video data into a plurality of blocks;
    obtaining a current prediction of a current block of the plurality of blocks using one or more motion vectors associated with the current block;
    obtaining one or more collocated predictions of the current block in one or more blending areas for overlapped block motion compensation (OBMC) by using one or more motion vectors of one or more neighbor blocks of the current block, wherein each of the one or more blending areas is a part of the current block and adjustable based at least on a coding mode of the current block; and obtaining an OBMC prediction of the current block by performing weighted averaging using a part of the current prediction and the one or more collocated predictions in the one or more blending areas;

wherein in response to determining that the current block is a coding block and the coding mode of the current block is a motion vector angular prediction (MVAP) mode where a motion vector of a sub-block inside the current block is projected from a motion vector of a neighbor block of the current block according to a project direction, the one or more blending areas comprise at least one of left boundary or top boundary of the current block, and each of the one or more collocated predictions of the current block is obtained by using one or more motion vectors of a neighbor block of the current block, wherein the motion vector of the sub-block inside the current block is calculated by one of following:

$pMV[x][y]=refMV[-1][x+y+1]$ for bottom-left direction, or $pMV[x][y]=refMV[-1][y]$ for left direction, wherein pMV denotes the motion vector of the sub-block inside the current block, and ref MV denotes the motion vector of the neighbor blocks of the current block.

7. The apparatus of claim 6, wherein obtaining the OBMC prediction of the current block comprises:
obtaining the OBMC prediction of the current block by using weights that are adaptively determined based on a height or a width of each of the one or more blending areas.

8. The apparatus of claim 6, wherein each of the one or more blending areas is adjustable further based on the partitioning.

9. The apparatus of claim 6, wherein a size of each of the one or more blending areas is determined based on a size of the current block.

10. The apparatus of claim 6, wherein each of the one or more collocated predictions is generated using one motion vector of a corresponding neighbor block of the one or more neighbor blocks of the current block.

11. A non-transitory computer readable medium storing computer code, which when executed by a processor, causes the processor to perform operations comprising:
partitioning a frame of video data into a plurality of blocks;
obtaining a current prediction of a current block of the plurality of blocks using one or more motion vectors associated with the current block;

obtaining one or more collocated predictions of the current block in one or more blending areas for overlapped block motion compensation (OBMC) by using one or more motion vectors of one or more neighbor blocks of the current block, wherein each of the one or more blending areas is a part of the current block and adjustable based at least on a coding mode of the current block; and obtaining an OBMC prediction of the current block by performing weighted averaging using a part of the current prediction and the one or more collocated predictions in the one or more blending areas;

wherein in response to determining that the current block is a coding block and the coding mode of the current block is a motion vector angular prediction (MVAP) mode where a motion vector of a sub-block inside the current block is projected from a motion vector of a neighbor block of the current block according to a project direction, the one or more blending areas comprise at least one of left boundary or top boundary of the current block, and each of the one or more collocated predictions of the current block is obtained by using one or more motion vectors of a neighbor block of the current block, wherein the motion vector of the sub-block inside the current block is calculated by one of following:

$pMV[x][y]=refMV[-1][x+y+1]$ for bottom-left direction, or $pMV[x][y]=refMV[-1][y]$ for left direction, wherein pMV denotes the motion vector of the sub-block inside the current block, and ref MV denotes the motion vector of the neighbor blocks of the current block.

12. The non-transitory computer readable medium of claim 11, wherein obtaining the OBMC prediction of the current block comprises:
obtaining the OBMC prediction of the current block by using weights that are adaptively determined based on a height or a width of each of the one or more blending areas.

13. The non-transitory computer readable medium of claim 11, wherein each of the one or more blending areas is adjustable further based on the partitioning.

14. The non-transitory computer readable medium of claim 11, wherein a size of each of the one or more blending areas is determined based on a size of the current block.

15. The non-transitory computer readable medium of claim 11, wherein each of the one or more collocated predictions is generated using one motion vector of a corresponding neighbor block of the one or more neighbor blocks of the current block.

* * * * *